United States Patent [19]

Hsei

[11] 4,405,060
[45] Sep. 20, 1983

[54] TABLET DISPENSING DEVICE

[75] Inventor: Paul K. Hsei, Huntington Beach, Calif.

[73] Assignee: American Hospital Supply Corporation, Evanston, Ill.

[21] Appl. No.: 285,022

[22] Filed: Jul. 20, 1981

[51] Int. Cl.³ .................... B65D 83/04; B65G 59/06
[52] U.S. Cl. .................... 221/135; 221/178; 221/183; 221/200; 221/264
[58] Field of Search .......... 221/263, 264, 135, 168, 221/178, 183, 184, 200, 202, 204, 94; 222/244, 361, 362

[56] References Cited

U.S. PATENT DOCUMENTS

| | | | |
|---|---|---|---|
| 423,033 | 3/1890 | Dieterich | 221/204 |
| 2,873,012 | 2/1959 | Lux | 221/178 |
| 2,886,253 | 5/1959 | Skibicki et al. | 221/135 |

FOREIGN PATENT DOCUMENTS 1398285  3/1965  France ........................... 221/204

*Primary Examiner*—H. Grant Skaggs
*Attorney, Agent, or Firm*—Don L. Barbeau; John H. Faro

[57] ABSTRACT

A tablet dispenser for dispensing a solid tablet or a predetermined number of tablets of a substantially uniform size from a storage area containing a relatively large number of tablets into a dispensing orifice upon operation of an external actuating mechanism. The tablet dispenser comprises a hollow body having an upper portion for storing the relatively large number of tablets and a lower base portion having the dispensing orifice formed in its bottom. A gate member is mounted for reciprocal movement above the tablet dispensing orifice and has a tablet receiving area formed therein. A field organizing member is mounted for reciprocal movement below the tablet storage portion and above the gate member and has a tablet receiving area formed therein which communicates with the tablet storage portion. A means interconnects the gate member and organizing member, this interconnecting means causing them to reciprocate in directions opposite each other whereby the gate member may be reciprocated from a tablet dispense position, wherein its tablet receiving area is in communication with the tablet dispensing orifice, to a tablet receiving position wherein its tablet receiving area is in communication with the tablet receiving area of the organizing member. An actuating means is further included for causing reciprocal movement of the gate member and organizing member in response to the operation of the external actuating mechanism.

33 Claims, 7 Drawing Figures

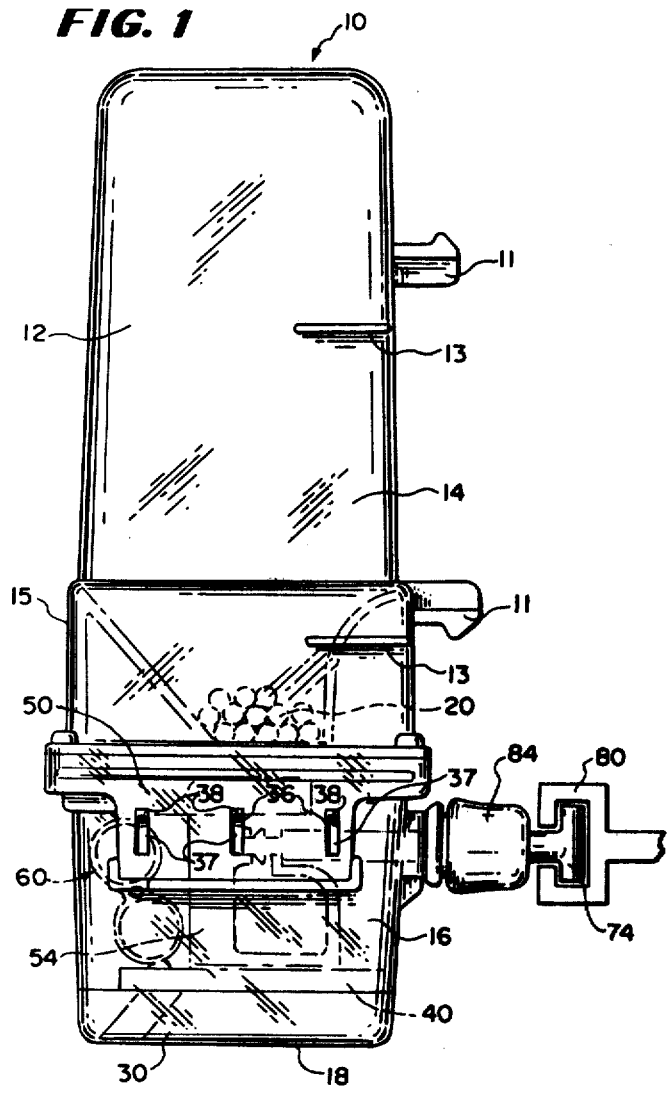
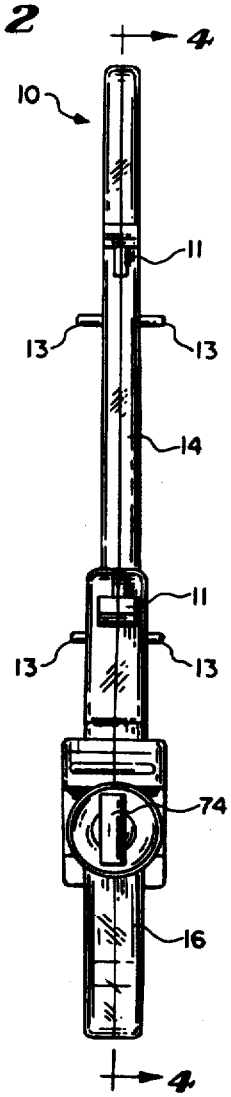
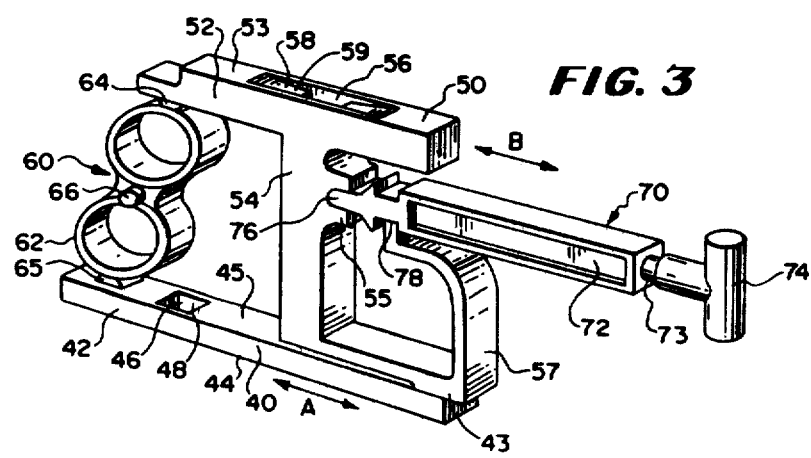

U.S. Patent  Sep. 20, 1983  Sheet 2 of 3  4,405,060
FIG. 4
FIG. 5
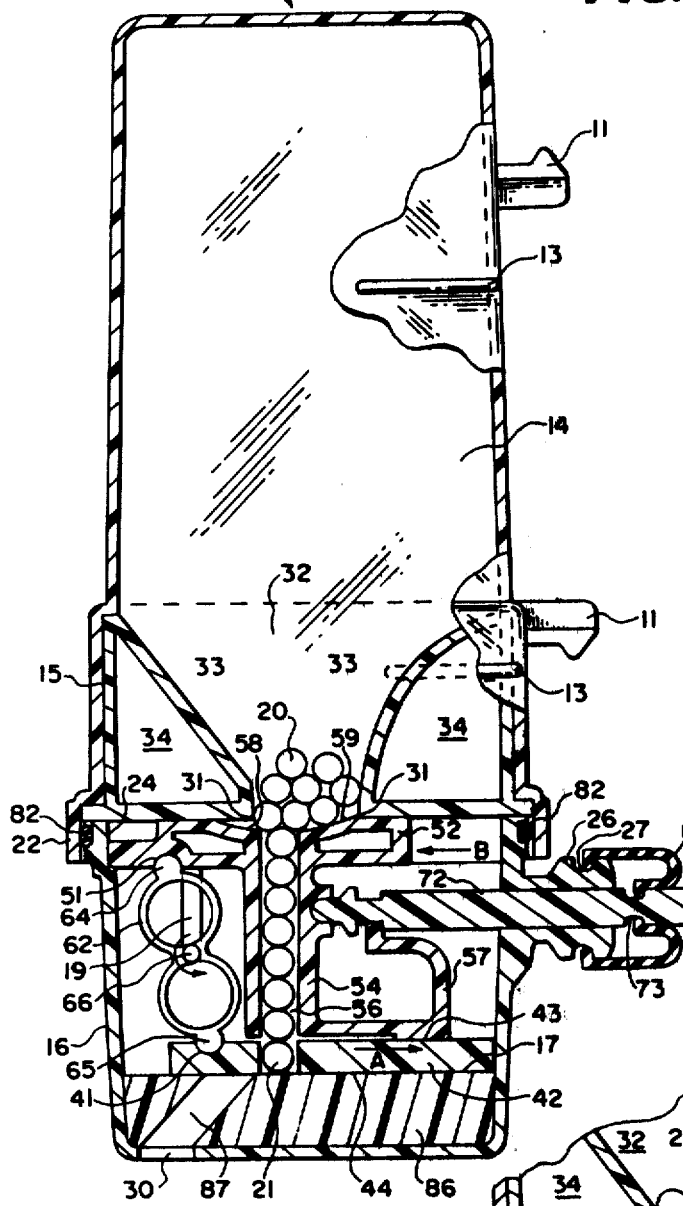
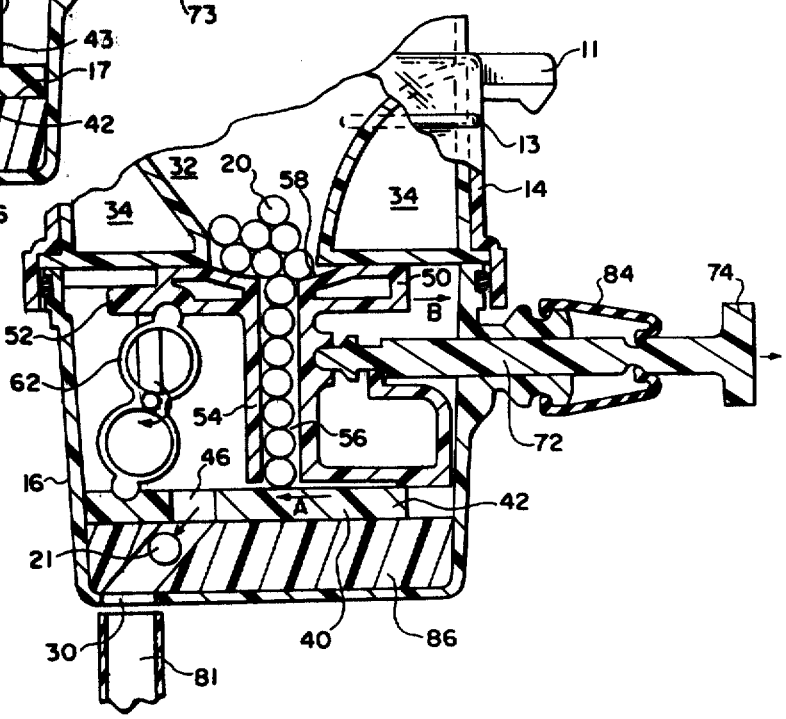

TABLET DISPENSING DEVICE

INTRODUCTION

The present invention relates generally to an article dispensing device, and more particularly, to a tablet dispenser for dispensing a solid tablet or a predetermined number of such tablets of substantially uniform size from a storage area containing a relatively large number of tablets into a dispensing orifice upon operation of an actuating mechanism. The present invention is particularly useful for dispensing disc-shaped reagent tablets in an automated clinical chemistry analyzer.

BACKGROUND OF THE INVENTION

Various devices are known and used for dispensing solid articles or tablets upon operation of an actuation means. However, such known dispensers have numerous drawbacks which make their use impractical for certain applications, such as reagent dispensers in automated clinical chemistry analyzers.

For example, since such automated analyzers are often left unattended, or the reagent dispensing takes place in an area where the operator cannot easily observe it, it is important that the dispenser reliably eject the exact number of tables (generally a single reagent tablet) every time it is activated. Otherwise, a false test result could be obtained. Furthermore, even if the analyzer is equipped to detect the fact that the reagent tablet has not been properly dispensed, this generally occurs downstream of the dispensing station and, due to the sequential nature of the automated instrument, it is not possible to bring the material being tested back to the dispensing station for the ejection of another tablet. Hence, the material, such as blood serum, entered into the analyzer for testing will be wasted.

Another problem encountered with the use of reagent tablets in clinical chemistry analyzers is that they are highly moisture-sensitive and, therefore, must be protected at all times from being exposed to even normal room humidity. Such exposure to ambient moisture will cause premature degradation of the reagent tablets, which may lead to inaccurate test readings. In addition, exposure to moisture may also cause the tablets to swell in size which may interfer with the reliable operation of the tablet dispenser.

Even if the dispenser storage area in the analyzer is dehumidified, in many instances it is still desirable to provide additional moisture protection for the tablets since they must generally be transported to and from the instrument in the dispenser and, even while stored in the instrument, it is possible for the dispenser to be exposed to high humidity levels associated with the operation of many such instruments in the event of equipment failure. This could be a particularly serious problem since such reagent tablets are relatively expensive and several thousand of them are likely to be stored in the analyzer at any given time.

BRIEF DESCRIPTION OF THE INVENTION

The tablet dispenser of the present invention is an improvement over known article dispensing devices in that it provides accurate, trouble-free and extremely reliable tablet dispensing. In addition, the dispenser of the present invention may be designed to provide a hermetical seal about the tablets which prevents direct ambient air moisture penetration to the tablets even during the actuation of the dispenser.

The tablet dispenser of the present invention comprises a hollow body having an upper portion for storing a relatively large number of tablets and a lower base portion having a dispensing orifice formed in its bottom. In the preferred embodiment, the tablets are disc-shaped and are stored in the dispenser along a single plane extending through their longitudinal axes.

Reciprocating gate and field organizing members are mounted within the lower base portion of the dispenser, each having tablet receiving areas or slots formed therein. When in its tablet dispense position, the tablet receiving slot of the gate member is in communication with the tablet dispensing orifice, thereby permitting the tablet to fall therethrough. The tablet receiving slot of the gate member is then reloaded with the next tablet to be dispensed by reciprocating it to its tablet received position wherein it is in communication with the tablet receiving area of the field organizing member. In this position, a single tablet (or, if desired, a predetermined number of tablets) is permitted to enter the receiving slot of the gate member from which it is dispensed through the tablet dispensing orifice upon the next cycle of the device.

The field organizing member is mounted below the tablet storage portion of the dispenser with its upper surface in communication with the tablets stored therein. An agitator means is formed on this upper surface of the field organizing member which engages the tablets and changes their array each time the organizing member is reciprocated, thereby preventing any prolonged blockage of the randomly-oriented tablets in the storage portion of the dispenser. Furthermore, in the preferred embodiment, the tablet receiving area of the field organizing member is formed as a tablet feed slide of sufficient length to store several tablets in a single vertical stack between the tablet storage portion of the dispenser and the gate member. This vertical stack of organized tablets ensures the continuous and reliable feed of tablets into the gate member slot, in spite of any temporary blockage of tablets that might occur in the storage portion of the dispenser between cycles of the field organizing member.

Interconnecting the gate and field organizing members is a means which causes them to reciprocate in directions opposite each other when the dispenser actuating means is operated. Due to this opposite reciprocal movement of the gate and field organizing members, the tablet receiving area of the organizing member will be moved out of communication with the tablet receiving slot of the gate member as the gate member reciprocates to its tablet dispense position. In this manner, the desired number of tablets is dispensed with each cycle of the gate member and the tablet storage portion remains sealed at all times from the dispensing orifice, thereby preventing the entry of ambient moisture to the tablet storage area of the dispenser.

Also disclosed is a unique design for constructing the gate and field organizing members and interconnecting means as a one-piece operating mechanism which greatly simplifies the assembly of the dispenser and reduces the overall parts cost thereof.

DESCRIPTION OF THE DRAWINGS

FIG. 1 is a side plan view of a tablet dispenser constructed in accordance with an embodiment of the present invention;

FIG. 2 is an edge view of the tablet dispenser shown in FIG. 1;

FIG. 3 is an enlarged perspective view of the tablet dispenser operating mechanism shown in FIG. 1;

FIG. 4 is an enlarged side sectional view of the tablet dispenser shown in FIG. 1 taken along line 4—4 of FIG. 2 illustrating the dispenser gate member in its tablet receive position;

FIG. 5 is a partial side sectional view of the tablet dispenser similar to that shown in FIG. 4 illustrating the dispenser gate member in its tablet dispense position;

DESCRIPTION OF THE PREFERRED EMBODIMENT

Figure 6:
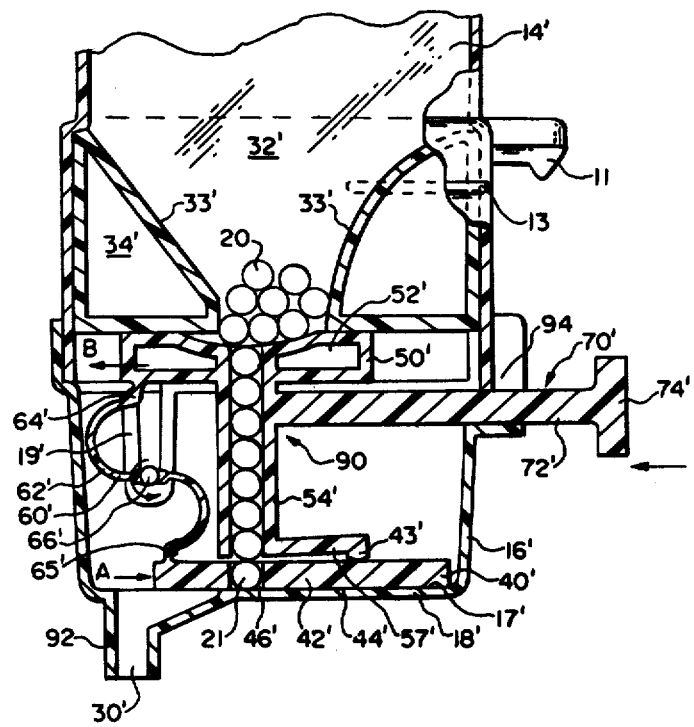
FIG. 6 is a partial side sectional view of a tablet dispenser similar to that shown in FIG. 4 illustrating an alternate, one-piece design of its operating mechanism, the gate member thereof being shown in its tablet receive position.

Referring to FIGS. 1 through 5, a tablet dispenser 10 is shown which is constructed in accordance with an embodiment of the present invention. Tablet dispenser 10 comprises a hollow body 12 having an upper portion 14 adapted for storing a relatively large number of tablets 20, and a lower base portion 16 having a dispensing orifice 30 formed in its bottom 18. Dispensing orifice 30 may be formed flush with bottom 18 of the dispenser or, as is shown in the alternate embodiment of FIGS. 6 and 7, for greater accuracy in dispensing tablet 21 into cuvette 81 it may be downwardly extended as barrel 92.

A gate member 40 is mounted within base portion 16 for reciprocal movement in the direction of arrows A above tablet dispensing orifice 30. As is best shown in FIGS. 3 through 5, gate member 40 is formed as an elongated horizontal bar 42 having its bottom surface 44 resting on the inner bottom surface 17 of base portion 16. Gate member 40 has a tablet receiving area 46 formed therein which, in the preferred embodiment, is formed as a slot 48 extending through elongated bar 42. The dimensional size of slot 48 is selected to permit a single tablet 21 (or a predetermined number of tablets in a multitablet dispense system) to enter and be held therein when gate member 40 is in its tablet receive position as is illustrated in FIG. 4.

A field organizing member 50 is also mounted within base portion 16 for reciprocal movement in the direction of arrows B below tablet storage portion 14 and above gate member 40. In the preferred embodiment, field organizing member 50 is constructed essentially as a T-shaped member having an upper horizontal section 52 and a feed slide section 54 depending downwardly from horizontal section 52.

A tablet receiving area 56 is formed through both upper horizontal section 52 and feed slide section 54 which communicates with tablet storage portion 14. As best shown in FIGS. 4 and 5, tablet receiving area 56, as it extends through feed slide section 54, is of sufficient length to store a number of tablets 21 in a single, substantially vertical stack. In this manner, the randomly arranged tablets 20 contained in storage portion 14 are organized into a single vertical column above gate member 40, thereby ensuring that a tablet 21 will always be available for dispensing into slot 48 even though a temporary blockage of tablets 20 may occur in storage portion 14 between cycles of reciprocating organizing member 50.

Also located on organizing member 50 is an agitator means 58 which engages tablets 20 contained in storage portion 14. In the preferred embodiment, agitator means 58 consists of a concave channel 59, formed in the upper surface 53 of horizontal section 52, which communicates with and guides tablets into tablet receiving area 56 due to its concave shape. As is shown in FIGS. 4 and 5, the length of tablet receiving area 56 is selected so that it will store an integral number of tablets of a predetermined diameter, and concave channel 59 has an overall depth of slightly less than half of the diameter of tablet 21. With this design it is not possible for any of the randomly arrayed tablets 20 within storage portion 14 to become wedged within or under the lower edge portion 31 of feed channel 32, in which position they might be sheared in half or otherwise broken by the reciprocal movement of organizing member 50. This is an extremely important consideration since the tests conducted by the chemical analyzer generally require that a precise amount of reagent be utilized in order to obtain accurate results.

As is best shown in FIG. 4, feed channel 32 is formed as a unitary piece which is mounted into a corresponding receiving portion 15 formed in the lower area of tablet storage portion 14. Feed channel 32 has a pair of inner tapered walls 33 which taper from the lower end of storage portion 14 to the concave channel 59 of organizing member 50. In this manner the most effective interface between stored tablets 20 and field organizing member 50 is established which causes the array of the tablets in feed channel 32 to be changed each time organizing member 50 is reciprocated, thereby preventing prolonged blockage or jamming of the tablets therein, while at the same time ensuring that the last tablet in storage portion 14 will be delivered into tablet receiving area 56 of organizing member 50 via its concave channel 59. In addition, the inner areas 34 formed by the tapered walls 33 of feed channel 32 may be utilized as a storage area for desiccant material (not shown) used for absorbing any mositure which may penetrate hollow body 12. It should be noted that if it is not desired to utilize inner areas 34 for storage of desiccant material, feed channel 32 may be integrally formed as a part of tablet storage portion 14 in order to reduce manufacturing and assembly cost.

Located between gate member 40 and organizing member 50 is an interconnecting member 60 which is utilized to reciprocate these members in directions opposite each other as is best shown in FIGS. 4 and 5. Interconnecting member 60 is formed in this embodiment of the invention as a compressible lever arm 62, shaped in the general configuration of a figure eight, having one of its ends 64 pivotably fitted within an engaging notch 51 formed in the underside of horizontal section 52 of organizing member 50 and its other end 65 pivotably fitted witin a similar engaging notch 41 formed in the upper side of elongated bar 42 of gate member 40. Lever arm 62 is also pivotably mounted at its center by shafts 66 which engage mating receptacles 19 formed in the side walls of lower base portion 16.

Compressible lever arm 62 serves several functions in the preferred embodiment apart from simply interconnecting gate member 40 and organizing member 50. It also acts as a spring which maintains gate member 40 securely against inner bottom surface 17 of the tablet dispenser base portion 16. Furthermore, since this compressed arm will continuously seek to expand to its greatest length, it will also serve as a detent mechanism which will tend to urge and lock gate member 40 and organizing member 50 in their fully reciprocated positions as shown in FIGS. 4 and 5.

Secured to feed slide section 54 of organizing member 50 is an actuating means 70 which causes reciprocal movement of the dispenser operating mechanism in response to an external actuating mechanism. This external actuator is illustrated in FIG. 1 as a C-shaped member 80 into which T-portion 74 or other suitable engaging member formed on the external end of actuator arm 72 may be positioned. The end 76 of actuator arm 72 opposite T-portion 74 is seated in a groove portion 55 formed in feed slide section 54. Adjacent to actuator arm end 76 is formed a notch area 78 which engages a compression spring 57 extending from the bottom end of feed slide section 54. This engagement permits actuator arm 72 to urge feed slide section 54 into the position illustrated in FIG. 5 when it is withdrawn from the dispenser, and engagement between actuator arm 72 and groove portion 55 permits feed slide 54 to be urged into the position illustrated in FIG. 4 when the actuator arm is pushed within the dispenser by external actuator 80. Compression spring 57 also cooperates with compressible lever arm 62 to maintain gate member 40 securely against bottom 18 of tablet dispenser base portion 16. For the purpose of reducing friction between compression spring 57 and the upper surface 45 of gate member 40, a smaller surface area extended portion 43 may be formed on the underside of compression spring 57 which engages and reciprocates across surface 45.

The embodiment of the present invention in FIGS. 1 through 5 is shown as providing a hermetical seal about the tablets contained in the dispenser. Due to the reciprocating nature of gate member 40 with respect to dispensing orifice 30 and field organizing member 50, no unsealed opening to ambient air exists which may permit moisture penetration into the dispenser. This remains true even during the dispensing of a tablet as is illustrated in FIG. 5.

The hermetical seal system of this embodiment of the invention consists of an O-ring 82 which is sealingly disposed between the outer lip 22 of tablet storage portion 14 and inner lip 24 of the dispenser base portion 16. Storage portion 14 is maintained in mating engagement with base portion 16 by means of a snap lock 36. As is best shown in FIG. 1, snap lock 36 consists of a series of fingers 37 formed on opposite sides of base portion 16 which lockingly engage a corresponding series of openings 38 formed in skirt portions 26 which downwardly depend from opposite sides of tablet storage portion 14. In order to facilitate the assembly of the dispenser, but prevent it from being tampered with thereafter, fingers 37 may be formed with a fish hook shape which do not permit the separation of the storage portion 14 and base portion 16 once joined in assembly.

A bellows-type seal 84 encloses the opening in base portion 16 where actuator arm 72 enters it. Surrounding this opening is guide 26 which is formed as a part of base portion 16. Guide 26 serves to align and support actuator arm 72, and it has a channel 27 formed about its periphery into which one of the ends of seal 84 sealingly fits. The other end of seal 84 similarly engages a channel 73 formed about the periphery of actuator arm 72, thereby completing the seal of this opening into the interior of dispenser body 12.

O-ring 82 and bellows seal 84 may be constructed of rubber, elastomer or other material which provides a satisfactory moisture barrier and which is sufficiently resillient to satisfy the operational requirements of the seal.

The only other opening into dispenser body 12 is through tablet dispensing orifice 30. This opening is maintained constantly sealed, even during actuation of the dispenser, through the interaction of gate member 40 with orifice 30 and feed slide section 54 of field organizing member 50.

Disposed on the inner surface of base bottom 18 is a sealing material 86 which may be made of urethane or similar material. A tablet ramp 87 is formed in sealing material 86 which communicates at its lower end with dispensing orifice 30 and at its upper end with slot 48 of gate member 40 when in its tablet dispense position illustrated by FIG. 5. As its best shown by FIGS. 4 and 5, the bottom surface 44 of gate member horizontal bar 42 sealingly engages the upper surface 17 of sealing material 86, which becomes the inner bottom surface of base portion 16.

When the operating mechanism of the tablet dispenser is in its standby or storage position as shown in FIG. 4, the bottom surface 44 of gate member 40 completely closes off and tightly seals the upper end of tablet ramp 87. This tight sealing engagement is maintained through the downward pressure exerted on gate member 40 by compressible lever arm 62 and compression spring 57. Hence, in this normal position of the dispenser, no moisture penetration is possible through dispensing orifice 30. Likewise, even when the operating mechanism of the tablet dispenser is momentarily reciprocated to its tablet dispense position as shown in FIG. 5, no direct path or opening exists to tablet storage portion 14 because feed slide section 54 is reciprocated opposite of and away from slot 48 of gate member 40. Hence, in this manner a nearly perfect hermetical seal is maintained at all times about the interior of hollow dispenser body 12.

Figure 7:
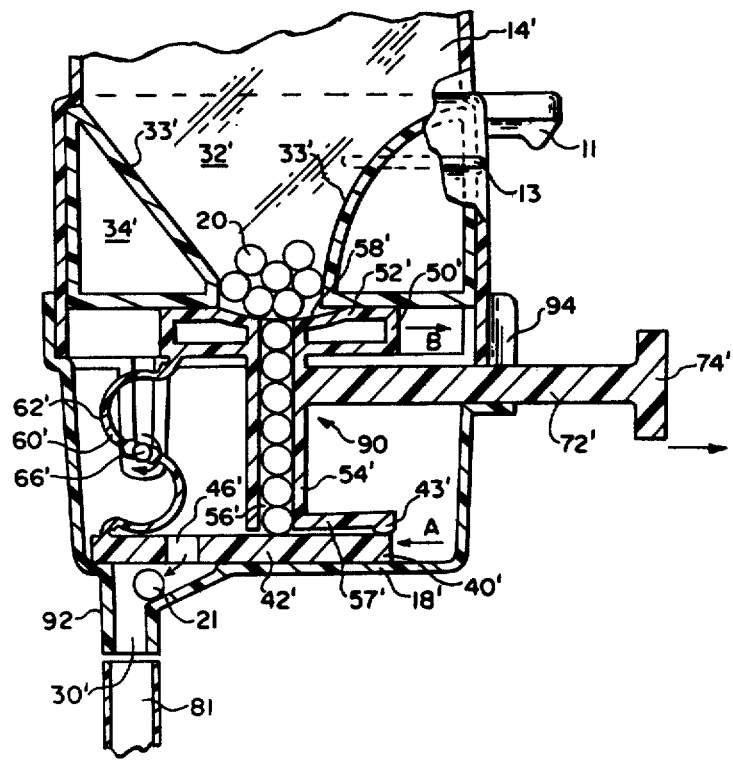
FIG. 7 is a partial side sectional view of the tablet dispenser similar to that shown in FIG. 5 illustrating the gate member of the alternate operating mechanism shown in FIG. 6 in its tablet dispense position.

FIGS. 6 and 7 illustrate an alternate embodiment of the present invention which does not include the sealing features of the above-described embodiment and which employes a unique one-piece receprocal operating mechanism. Due to its simplicity, the design of this alternate embodiment greatly facilitates the assembly of the dispenser and significantly reduces the overall parts cost thereof. For the sake of clarity, the portions of this alternate embodiment corresponding to the above-described embodiment have been numbered the same, and those portions which are functionally equivalent have been designated with a prime notation.

As with the above-described embodiment of the present invention, one-piece reciprocal operating mechanism 90 is positioned within base portion 16' of the dispenser between tablet storage portion 14' and the bottom 18' of the base portion having dispensing orifice 30' formed therein. In this embodiment orifice 30' is shown as having a barrel 92 formed thereon which aids in precisely directing the tablet 21 dispensed therefrom into cuvette 81.

Since it is not desired to maintain a hermetical seal about tablets 20 stored in this embodiment of the dispenser, the bottom surface 44' of gate member 40' rests directly on inner bottom surface 17' of base portion 16'. Actuator arm 72' of actuating means 70' is formed as an extension of feed slide 54' and organizing member 50' and gate member 40' are joined by an interconnecting member 60' which causes reciprocal movement of these members by flexing at its connecting ends 64' and 65'.

In view of the fact that it is not required in this embodiment that interconnecting member 60' compressively urge gate member 40' downward with sufficient force to maintain a tight seal between gate member bottom surface 44' and base portion inner bottom surface 17', it may be formed as a simple S-shaped lever arm 62'. Likewise, compression spring 57' is also formed as a simple lever extending from the bottom end of feed slide section 54'. In order to maintain some downward force on the end of gate member elongated horizontal bar 42' away from lever arm 62', a rib portion 43' is formed at the free end of compression spring 57'. This design creates a small downwardly directed flex force in compression spring 57' which cooperates with the limited compressive force of lever arm 62' to properly position gate member 40' within base portion 16' when operating mechanism 90 is locked between tablet storage portion 14' and base portion 16'.

Since the operating mechanism 90 is formed as a single piece, during the assembly of the dispenser it is dropped into base portion 16' so that actuator arm 72' is positioned in slot 94 formed in the upper edge of base portion 16' and shafts 66' of lever arm 62' engage mating receptacles 19' formed in the inner side walls of base portion 16'. When the operating mechanism is locked between tablet storage portion 14' and base portion 16', lever arm 62' will be compressed between gate member 40' and field organizing member 50' and it will serve as a detent mechanism as described above with respect to the alternate embodiment of the present invention. Furthermore, all of the other features of the reciprocal operating mechanism described above with respect to the alternate embodiment of FIGS. 1 through 5 apply equally to this embodiment and, therefore, will not be repeated.

As noted in the introductory remarks, the tablet dispenser of the present invention is especially suitable for use in an automated clincial analyzer in which a variety of chemical tests may be performed on a blood serum sample. In such an instrument, a number of such dispensers would be contained in the instrument, each containing a different type of reagent tablet suitable for performing a particular chemical test on the serum sample.

Since it may be desirable from a mechanical and operational standpoint that the dispensers eject their reagent tablets from a common dispensing station into a single cuvette channel, the dispensers should be capable of being moved into and out of the dispensing station where they will be engaged by the actuating mechanism of the instrument. The unique dispenser actuating arm design of the present invention permits this objective to be easily achieved.

Referring to FIG. 1 of the drawings, actuator arm 72 is shown as having a T-portion 74 (although other equivalent engaging members could be utilized) which may be linearly or rotationally moved along a horizontal plane into engagement with C-shaped actuating mechanism 80, which is a part of and controlled by the chemical analyzer (not shown). Hence, with this arrangement only a single actuating mechanism 80 is required in the instrument which greatly reduces its mechanical complexity. Furthermore, the dispensing of the different types of reagent tablets used can be made from a single location, which permits the simplification of the instrument's operational requirements.

Since it is also desirable that the dispenser be easily removable from the instrument, a pair of mounting ears 11 are formed along the lateral edge of dispenser body 12 which frictionally secure the dispenser to an appropriate carrying mechanism within the instrument. In addition, insert guides 13 are formed on the side faces of dispenser body 12 in order to aid in orienting the dispenser within the instrument carrying mechanism. Mounting ears 11 and insert guides 13 must be precisely located on the dispenser body 12 with respect to orifice 30 in order to insure that the orifice will be properly aligned with respect to cuvette 81 when it is positioned at the tablet dispensing station.

Although several specific embodiments of the present invention have been described above and shown in the drawings, it is to be understood that obvious variations and modifications thereof falling within the scope and spirit of the present invention may be made as required by those skilled in the art. It is therefore intended that the following claims be construed as including such variations and modifications of the present invention.

What is claimed is:

1. A tablet dispenser for dispensing a solid tablet or a predetermined number of tablets of a substantially uniform size from a storage area containing a relatively large number of tablets into a dispensing orifice upon operation of an external actuating mechanism, said tablet dispenser comprising:

a hollow body having an upper portion for storing the relatively large number of tablets and a lower base portion having the dispensing orifice formed in its bottom;

a gate member mounted for reciprocal movement above said tablet dispensing orifice, said gate member having a tablet receiving area formed therein;

a field organizing member mounted for reciprocal movement below said tablet storage portion and above said gate member, said organizing member having a tablet receiving area which communicates with said tablet storage portion and is unitary with said organizing member;

said tablet receiving area of the organizing member further having an agitator means for engaging said tablets and changing their array as said organizing member is reciprocated, and for guiding said tablets into the tablet receiving area of said organizing member;

interconnecting means for reciprocating said gate member and said organizing member in directions opposite each other, whereby said gate member may be reciprocated from a tablet dispense position wherein its tablet receiving area is in communication with said tablet dispensing orifice to a tablet receiving position wherein its tablet receiving area is in communication with said tablet receiving area of said organizing member; and actuating means for causing reciprocal movement of said gate member and said organizing member in response to the operation of the external actuating mechanism.

2. The tablet dispenser of claim 1 wherein said agitator means is a concave channel formed in the upper surface of said organizing member which communicates with the tablet receiving area of said organizing member.

3. The tablet dispenser of claim 1 wherein the tablet receiving area of the organizing member further defines a downwardly depending feed slide extending from the tablet storage portion at its upper end to said gate member at its lower end; said feed slide being of sufficient length to store a multiple number of tablets in a substantially single stack when said gate member is reciprocated to its tablet dispense position.

4. The tablet dispenser of claim 1 further comprising a mounting means for securing the dispenser to a carrying mechanism within an automated chemical analyzer, said mounting means being precisely located on the upper portion of the hollow body with respect to the dispensing orifice and the actuating means whereby said dispensing orifice will be properly aligned with respect to the tablet receiving receptacle of the analyzer when said dispenser is positioned at a tablet dispensing station.

5. A tablet dispenser for dispensing a solid tablet or a predetermined number of tablets of a substantially uniform size from a storage area containing a relatively large number of tablets into a dispensing orifice upon operation of an external actuating mechanism, said tablet dispenser comprising:
- a hollow body having an upper portion for storing the relatively large number of tablets and a lower base portion having the dispensing orifice formed in its bottom;
- a gate member mounted for reciprocal movement above said tablet dispensing orifice, said gate member having a tablet receiving area formed therein;
- a field organizing member mounted for reciprocal movement below said tablet storage portion and above said gate member, said organizing member having a tablet receiving area which communicates with said tablet storage portion and is unitary with said organizing member;
- said tablet receiving area of the organizing member further defining a downwardly depending feed slide extending from the tablet storage portion at its upper end to said gate member at its lower end; said feed slide being of sufficient length to store a multiple number of tablets in a substantially single stack when said gate member is reciprocated to its tablet dispense position;
- interconnecting means for reciprocating said gate member and said organizing member in directions opposite each other, whereby said gate member may be reciprocated from a tablet dispense position wherein its tablet receiving area is in communication with said tablet dispensing orifice to a tablet receiving position wherein its tablet receiving area is in communication with said tablet receiving area of said organizing member; and
- actuating means for causing reciprocal movement of said gate member and said organizing member in response to the operation of the external actuating mechanism.

6. The tablet dispenser of claim 5 wherein the organizing member further comprises a substantially horizontally disposed elongated bar having a substantially flat upper surface, and an agitator means thereon which engages the tablets in said storage portion and changes their array as said organizing member is reciprocated; said agitator means being a concave channel in the upper surface of said organizing member which communicates with the tablet receiving area of said organizing member.

7. The tablet dispenser of claim 3 or 6 further comprising a tablet feed channel which tapers from the lower end of said storage portion to said organizing member whereby the reciprocation of said organizing member will cause said agitator means to change the array of said tablets in said feed channel.

8. The tablet dispenser of claim 6 wherein said tablets are disc-shaped and are disposed in a single plane extending through their longitudinal axes.

9. The tablet dispenser of claim 6 wherein said actuating means comprises an actuator arm secured at its end to said organizing member, the other end of said actuator arm extending through said hollow body and being adapted to engage said external actuating mechanism.

10. The tablet dispenser of claim 9 wherein the end of said actuator arm adapted to engage said external actuating mechanism is formed as a releasable engaging means.

11. The tablet dispenser of claim 10 wherein said releasable engaging means mechanically engages said external actuating mechanism.

12. The tablet dispenser of claim 11 wherein said releasable engaging means is a protrusion formed on the end of said actuator arm which engages a mating slot formed in said external actuating mechanism when moved laterally therein.

13. The tablet dispenser of claim 12 wherein said protrusion is a T-portion and said mating actuating mechanism slot is C-shaped cavity.

14. The tablet dispenser of claim 6 wherein said tablets are moisture sensitive and said hollow body forms a hermetical seal about said tablets, said gate member and organizing member reciprocating with respect to each other in a manner such that said tablet storage portion remains substantially sealed at all times from said dispensing orifice.

15. The tablet dispenser of claim 14 further comprising a means for sealing said hollow body where said actuator arm extends therethrough.

16. The tablet dispenser of claim 6 wherein said gate member is an elongated bar having its bottom surface resting on the inner bottom surface of said base portion and said tablet receiving area of said gate member is a slot formed through said elongated bar, the dimensional size of said slot permitting the predetermined number of tablets to be dispensed to enter therein when said gate member is in its tablet receive position.

17. The tablet dispenser of claim 16 wherein the bottom surface of said feed slide rests on the top surface of said elongated bar, said feed slide being reciprocal along said top surface between a tablet dispense position corresponding to the tablet receive position of said gate member wherein said feed slide communicates with said gate slot, and a tablet storage position corresponding to the tablet dispense position of said gate member wherein said feed slide is blocked by the upper surface of said elongated bar.

18. The tablet dispenser of claim 16 further comprising a resilient sealing material positioned between said elongated bar bottom surface and the inner bottom surface of said base portion.

19. The tablet dispenser of claim 6 wherein said interconnecting means comprises a compressible lever arm having one end secured to said gate member and its other end secured to said organizing member, said lever arm being pivotably mounted.

20. The tablet dispenser of claim 19 further comprising a compression spring extending between said gate member and said organizing member, said compression spring and said compressible lever arm cooperating with said organizing member to maintain said gate member in sealing contact with the inner bottom surface of said base portion.

21. The tablet dispenser of claim 6 further comprising a desiccant material located within said hollow body.

22. The tablet dispenser of claim 6 further comprising a means for precisely locating said dispensing orifice and supporting the tablet dispenser when operated by said external actuating mechanism.

23. The tablet dispenser of claim 22 wherein said locating and supporting means comprises a pair of mounting ears formed along the lateral edge of said hollow body.

24. The tablet dispenser of claim 23 wherein said locating and supporting means further comprises an insert guide formed on the face of said hollow body.

25. The tablet dispenser of claim 24 wherein said mounting ears and insert guide are precisely located on said hollow body with respect to said dispensing orifice.

26. The tablet dispenser of claim 6 wherein the upper storage portion and the lower base portion of said hollow body are formed as two separate pieces having a means formed thereon for securing said pieces together.

27. The tablet dispenser of claim 26 wherein said securing means includes a means for sealing said pieces when secured together.

28. The tablet dispenser of claim 26 wherein said securing means is a unidirectional locking means for permitting said storage and base portions to be easily joined together, but does not permit their separation once so joined.

29. The tablet dispenser of claim 28 wherein said unidirectional locking means comprises fingers having a fish hook shape formed on one of said pieces and corresponding openings formed on the other of said pieces.

30. The tablet dispenser of claim 6 wherein said gate and organizing members, interconnecting and actuating means are formed as a one-piece element.

31. The tablet dispenser of claim 30 wherein said one-piece element is constructed of an elastic plastic material.

32. A tablet dispenser for dispensing a solid tablet or a predetermined number of tablets of a substantially uniform size to an automated chemical analyzer from a storage area containing a relatively large number of tablets into a dispensing orifice upon operation of an external actuating mechanism, said tablets being substantially disc-shaped and having a predetermined diameter, said tablet dispenser comprising:

a hollow body having an upper portion for storing the relatively large number of disc-shaped tablets in a single-plane, and a lower base portion having the dispensing orifice formed in its bottom wherein said dispensing orifice is a downwardly depending barrel having a length sufficient to direct the dispensed tablets into the analyzer;

horizontally disposed gate member mounted for reciprocal movement above said tablet dispensing orifice wherein said gate member is an elongated bar having a substantially flat upper surface and having its bottom surface resting on the inner bottom surface of said base portion, said bar having a slot formed therethrough of sufficient dimensions to receive and dispense the predetermined number of tablets;

a horizontally disposed field organizing member mounted for reciprocal movement below said tablet storage portion and above said gate member, wherein said organizing member comprises an elongated bar having a substantially flat upper surface and a concave channel formed in said upper surface which communicates with the tablet storage portion, said channel having an overall depth of slightly less than half of the predetermined diameter of said tablets; and a tablet receiving area defining a downwardly depending feed slide extending from the tablet storage portion at its upper end to said gate member at its lower end, wherein the bottom surface of said feed slide rests on the top surface of said gate member and the upper end of said feed slide is unitary with said organizing member, said feed slide being of sufficient length to store a multiple number of tablets in a substantially single stack and in a single-plane when said gate is reciprocated to its tablet dispense position;

interconnecting means for reciprocating said gate member and said organizing organizing member in directions opposite each other, wherein said interconnecting means comprises a compressible lever arm having one end secured to said gate member and its other end secured to said organizing member, said lever arm being pivotably mounted in said lower base portion of the hollow body;

a tablet feed channel formed in the lower area of said table storage portion, said feed channel having one or more walls which taper from the lower end of said storage portion to the concave channel of said organizing member; and actuating means for causing reciprocal movement of said gate member and said organizing member in response to the operation of the external actuating mechanism, wherein said actuating means is a horizontal bar extending laterally from the organizing member through the wall of the lower base portion in the hollow body.

33. The tablet dispenser of claim 32 further comprising a mounting means for securing the dispenser to a carrying mechanism within said analyzer, said mounting means being precisely located on the upper portion of the hollow body with respect to the dispensing orifice and the actuating means whereby said orifice will be properly aligned with respect to the tablet receiving receptacle of the analyzer when said dispenser is positioned at a tablet dispensing station.

* * * * *